United States Patent [19]
Thompson et al.

[11] 3,915,540
[45] Oct. 28, 1975

[54] CABLE BONDING ASSEMBLY FOR USE WITH SPLICED CABLES

[76] Inventors: John T. Thompson, 244 Loring St., Los Angeles, Calif. 90024; George W. Gillemot, 2331 - 20th St., Santa Monica, Calif. 90405

[22] Filed: Mar. 11, 1974

[21] Appl. No.: 449,753

Related U.S. Application Data

[63] Continuation-in-part of Ser. No. 348,949, April 9, 1973, abandoned.

[52] U.S. Cl. ............... 339/95 R; 174/78; 174/88 R; 339/14 L; 339/266 R
[51] Int. Cl.[2] ............... H01R 9/08; H02G 15/10
[58] Field of Search .... 339/14 R, 14 L, 95 R, 97 R, 339/98, 99, 263, 266; 174/78, 88 R, 92, 93; 24/248 SA, 248 LS

[56] References Cited
UNITED STATES PATENTS

| | | | |
|---|---|---|---|
| 526,490 | 9/1894 | Jessen | 339/266 R |
| 1,702,124 | 2/1929 | Matthes | 339/266 L |
| 3,209,067 | 9/1965 | Channell et al. | 174/78 X |
| 3,253,247 | 5/1966 | Vos | 339/95 R |
| 3,614,298 | 10/1971 | Thompson | 174/92 |
| 3,676,836 | 7/1972 | Gillemot et al. | 339/97 R |
| 3,757,269 | 9/1973 | Baumgartner et al. | 339/95 R |
| 3,808,353 | 4/1974 | Burtelson | 339/14 R |

*Primary Examiner*—Roy Lake
*Assistant Examiner*—Neil Abrams
*Attorney, Agent, or Firm*—Harris, Kern, Wallen & Tinsley

[57] ABSTRACT

A bonding kit assembly and assembly and method for use in bonding together the shields of spliced cables interiorly of a shielded splice housing with a bonding connection to the splice casing. The bonding unit per se comprises a pair of shoes insertable lengthwise of each cable end and between the leading ends of which wide areas of the cable shield and sheath are compressively sandwiched as the leading ends of the shoes are pivoted thereagainst by clamping means and cooperating fulcrum means between the trailing ends of said shoes. The fulcrum means includes either a single or a pair of broad edged tangs crosswise of the shoes and supplementing the shoe clamping bolt in providing a low resistance high density current path between the two shoes. The leading ends of the bonding shoes extend beneath gasketing at the cable entrances to the splice housing and are interconnected at the opposite ends of the cable splice by heavy duty conductive strapping and solderless connectors, the bonding strap including a branch bonded to the splice casing. The heavy duty strapping transfers cable tensile stresses across the splice connections without reliance on the splice casing for this purpose. The latter may be opened for servicing without disturbing or interfering with the integrity of the installed bond assembly or risk of placing any splice connection under tensile stress. The splice casing is usable with a wide range of cable sizes without need for adapters and provides a grounded shield for the spliced conductors which overlaps the cable shield at each end of the splice.

13 Claims, 9 Drawing Figures

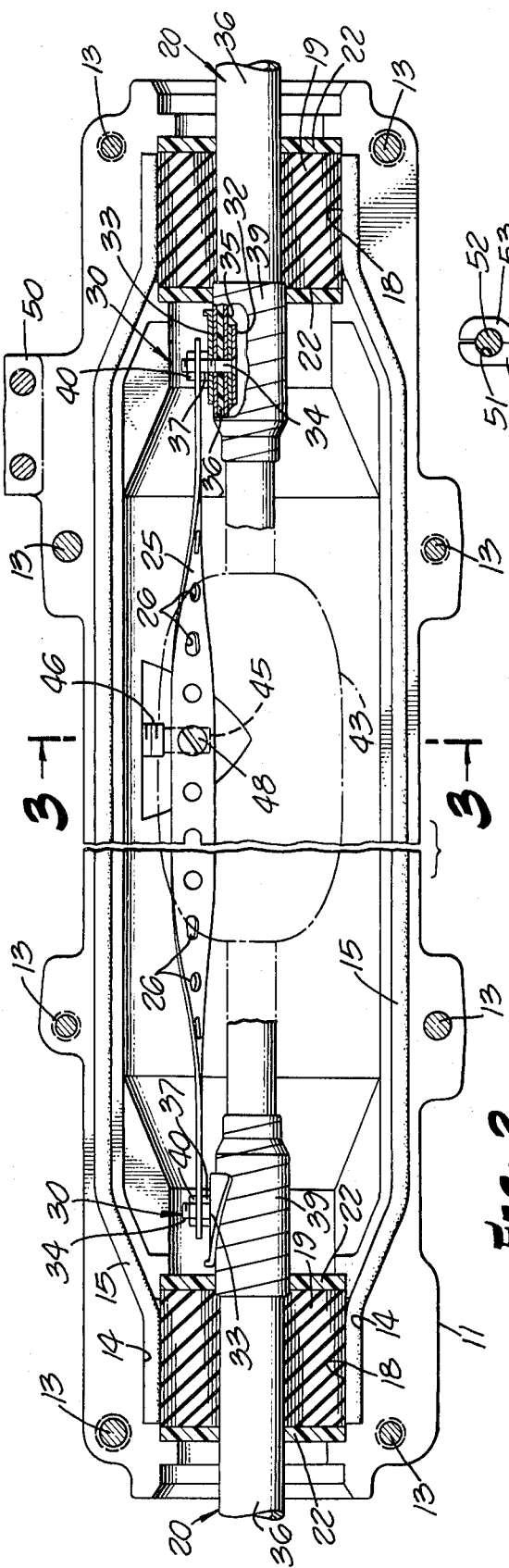

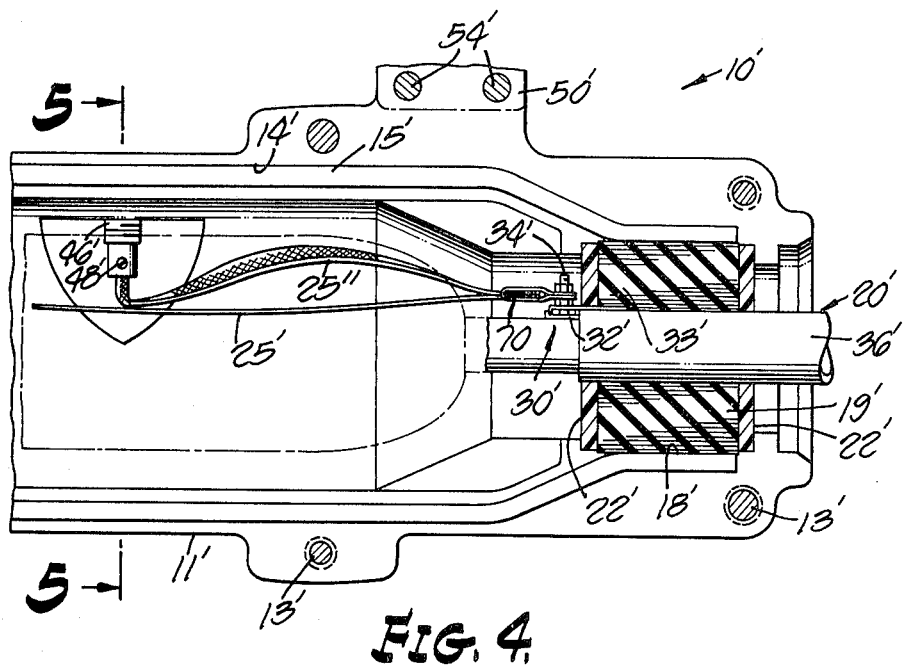
FIG. 4.
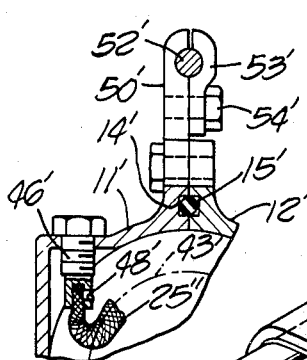
FIG. 5.
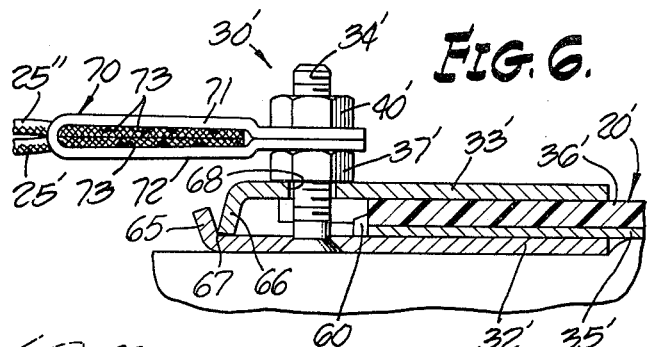
FIG. 6.
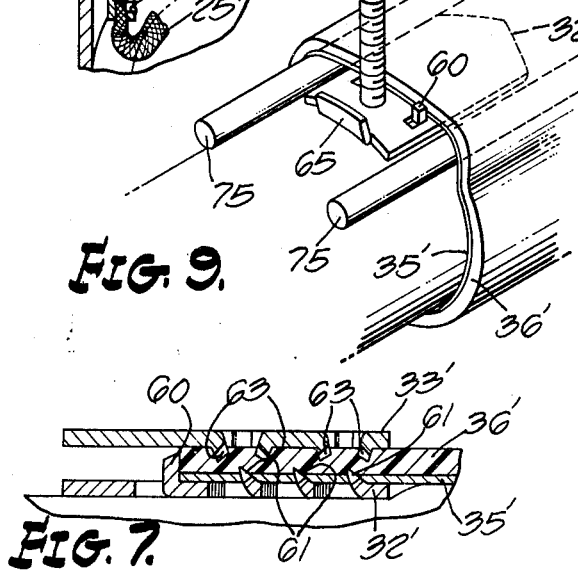
FIG. 9.
FIG. 7.
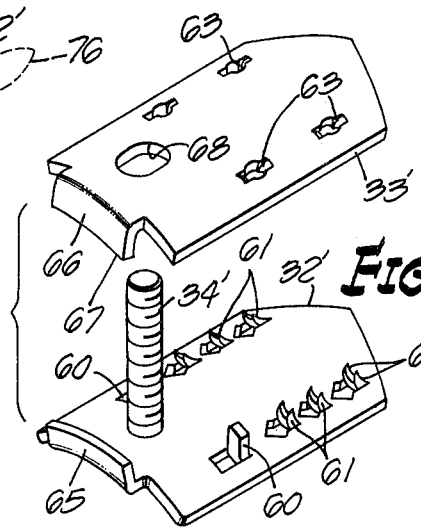
FIG. 8.

CABLE BONDING ASSEMBLY FOR USE WITH SPLICED CABLES

This application is a continuation-in-part of our co-pending application Ser. No. 348,949, filed Apr. 9, 1973, and now abandoned.

This invention relates to bonding devices and techniques, and more particularly to an improved bonding assembly and load transfer device as well as to a kit of components and to a method of utilizing the same to provide a superior solderless bonding connection between spliced shielded cables and a shielded splice casing therefor avoiding the need for adapters to accommodate different size cable and splice casings.

A growing number of multiple conductor cables must be shielded to meet present day operating requirements and this presents problems in interconnecting the shield jackets at the opposite ends of a cable splice and including provision for bonding this connection to a shielded splice casing. For various reasons well known to persons skilled in the art including practical considerations, the bonding connection to a cable shield is preferably made with solderless connector means and this presents problems because of the thin and negligible mechanical strength of the shielding. A widely used and highly satisfactory technique clamps the cable shield and sheath together between wide area shoes thereby utilizing the mechanical strength of the cable sheath as a backup for the cable shield. A bonding assembly of this type is shown in U.S. Pat. No. 3,676,836 dated July 11, 1972 while a modified construction utilizing similar principles is disclosed in U.S. Pat. No. 3,753,204, dated Aug. 14, 1973. Such bonding assemblies necessitate slitting the cable sheath and shield lengthwise from one end or, alternatively, slitting one side of the cable sheath and punching a hole in an area displaced to one side of the slit. These operations permit the shield and sheath to be expanded sufficiently for the insertion of the inner one of the bonding shoes. Slitting the cable sheath is usually followed by serving the sheath after installation of the bonding unit, with tape to hold the slit end closed compactly about the conductors. Even though the cable is protected by this tape wrapping it frequently is not as strong as formerly and requires additional time, effort and skill in its proper preparation.

Another problem associated with cable splices and not satisfactorily resolved by prior bonding proposals is associated with the lack of adequate room inside splice casings to accommodate the spliced conductors. Space is always at a premium since splice casings are customarily designed to use a minimum of material and space. Accordingly, bonding techniques customarily require some space at either end of the interior of the casing. This necessity reduces the space available to house the splice connection.

It is important that suitable provision be made for anchoring each cable entering the splice casing in some manner to avoid risk of putting a tensile load on the splice connections themselves. The problems involved are accentuated when using shielded cable because the anchor means must then include provision for an electrical bonding connection to the casing or to some source of ground potential. Various expedients meeting these needs have been proposed but these usually involve various types of devices installable about the cable at its entry into the end of the splice casing. Such anchor devices must be specially designed for each size of splice casing opening and each size of cable entering that end. It is at once evident that a wide range of adapter sizes and anchor assemblies are required thereby posing stock control, inventory and cost problems. Not infrequently workmen in the field find the supply of a particular size exhausted with the result that they are unable to proceed with the splicing operation until the proper size adapter is at hand. Among other disadvantages of prior construction is the fact that the cable anchor assembly necessitates applying compressive forces to the cable itself which presents hazards to the conductors underlying the clamp as well as interfering with the flow of gas with which many cables are charged to preclude the entry of moisture. Furthermore, prior bonding techniques for making a solderless bonding connection to the cable shield have inadequate current carrying capacity to meet the need presented by lightning surges and heavy currents encountered in accidents and the like hazards.

The foregoing and numerous other shortcomings of prior bonding proposals are avoided by the present invention utilizing a kit of components of simple, rugged construction characterized by their suitability for universal use with a wide range of splice casing and cable sizes and the ease with which the kit components may be installed and by the minimum amount of space occupied interiorly of the splice casing. The bonding assembly per se is designed for insertion endwise into the end of the cable sheath and shield without need for either slitting, notching or perforating these components and with only a minor portion of the trailing end of the installed assembly exposed beyond the interior end of the cable gasketing. The two bonding shoes are confined along one side of the cable and the adjustable clamping bolt is located immediately adjacent the end of the cable sheath inwardly of fulcrum means about which the leading ends of the shoes pivot as they are clamped astride the cable shield and sheath. The bonding assemblies, firmly anchored to the cable in this manner, are interconnected by flexible high capacity strapping of sufficient strength to transfer cable tensile stresses between the opposite ends of the splice proper. This strapping includes provision for bonding it to the splice casing shield which, in turn, is bonded to a grounded messenger cable. These expedients not only provide a complete shield for the spliced conductors but bonds the same to the cable shields. The current handling capacity of the large area clamping bolt is augmented by the equal or greater current carrying capacity of the fulcrum between the trailing ends of the two shoes.

It is therefore a primary object of the present invention to provide an improved, superior kit of bonding components for completing an electrical bonding connection between interspliced shielded cables and a shielded splice casing therefor. Another object of the invention is the provision of an improved method of electrically bonding together interspliced shielded cables without need for slitting, notching, or perforating the cable sheath and shield and without constricting or compressing the cable conductors in the vicinity of the bonding connection.

Another object of the invention is the provision of an improved solderless bonding assembly between the pivotally interconnected shoes of which the cable sheath and shield can be compressively sandwiched by adjustable clamping means located beyond the end of the cable sheath.

Another object of the invention is the provision of an improved solderless bonding assembly for shielded cables utilizing a pair of wide area shoes the leading ends of which are astride the cable sheath and shield after being inserted lengthwise from the end of the cable and utilizing fulcrumed clamping means between the trailing ends of the shoes located closely outside the end of the cable sheath.

Another object of the invention is the provision of a solderless bonding assembly for shielded cables comprising elongated transversely arched shoes having internesting tangs facing toward one another at the trailing ends of the shoes and closely adjacent adjustable clamping means for pivoting the shoes toward one another with one tang acting as a fulcrum.

Another object of the invention is the provision of an improved bonding method for a cable splice utilizing bonding assemblies having a leading end insertable lengthwise and astride the end of the cable shield and sheath with a major portion of their leading ends surrounded by gasketing installable about the cabling at its entrance into a cable splice casing.

Another object of the invention is the provision of an improved cable bonding assembly utilizing a pair of wide area metal shoes sandwiched about a cable shield and sheath and pivotable about a long fulcrum by a clamping bolt which fulcrum together with said bolt provides dual high capacity electrical paths to ground from the cable shield.

Another object of the invention is the provision of a bonding assembly for shielded cables comprising a pair of long similarly transversely-arched metal shoes having a clamping bolt betwen their trailing ends and cooperating with out board fulcrum means between their trailing ends to compress a wide area portion of a cable shield against a similar area of the cable sheath with a multiplicity of sharp metal burrs penetrating into the cable shield.

Another object of the invention is the provision of an improved method of bonding shielded cables together between the opposite ends of spliced connections without need for disturbing the integrity of the bond when opening the splice casing to gain access to the splice connections.

Another object of the invention is the provision of an improved cable bonding assembly for cables undergoing splicing and serving additionally to transfer load stresses between the cable ends without risk of strain on the splice connections.

Another object of the invention is the provision of a universal splice casing readily hermetically sealable to a wide range of cable sizes and having a combined load transfer means and conductive bonding means functioning independently of the splice casing itself to transfer cable stresses past the splice connections as well as to provide a high capacity conductive path between the cable shields and to a source of ground potential.

Another object of the invention is the provision of an improved and simplified cable splice housing suspendable from a grounded messenger cable and having a high capacity electrical connection to each cable shield functioning entirely independently of the means for sealing the ends of the splice housing to the cable ends.

These and other more specific objects will appear upon reading the following specification and claims and upon considering in connection therewith the attached drawing to which they relate.

Referring now to the drawing in which two illustrative embodiments of the invention are illustrated:

FIG. 1 is a top plan view of one illustrative embodiment of the invention solderless bonding accessory assembled to an encased cable splice;

FIG. 2 is a cross sectional view on an enlarged scale taken along line 2—2 on FIG. 1;

FIG. 3 is a cross sectional view taken generally along line 3—3 on FIG. 2;

FIG. 4 is a longitudinal sectional view through one end of a splice casing a second illustrative embodiment of the invention solderless bonding accessory installed therein;

FIG. 5 is a cross sectional view taken along line 5—5 on FIG. 4;

FIG. 6 is a longitudinal sectional view on an enlarged scale of the solderless bonding connection between the cable sheath and shield jackets and the adjacent portion of the conductive tensile strap bridging the cable splice;

FIG. 7 is a fragmentary longitudinal sectional view on an enlarged scale of the right hand end portion of FIG. 6 and taken through one aligned set of sharp edged projections;

FIG. 8 is an exploded isometric view of the bonding accessory clamping shoes; and FIG. 9 is a fragmentary perspective view of the cable shield and sheath held expanded for the insertion of the inner bonding shoe by a pair of prongs.

Referring to FIGS 1–3, there is shown a cable splice casing according to the present invention, designated generally 10, comprising two semi-cylindrical halves 11,12 having radial flanges along their lateral edges securable to one another by clamping cap screws 13. A shallow channel 14 extending along and opening through the faces of the mating flanges seats resilient sealing material 15 in accordance with customary practice. Each end of the housing halves is provided with a shallow wide groove 18 for seating engagement with the periphery of a soft collar of tacky sealing material, such as multiple convolutions of Buna tape 19 or the like wrapped about the cable ends 20,20 to the requisite thickness to fill the annular space between the exterior of the cables and the bottoms of grooves 18. Desirably split fiber rings 22 are installed about the cable to protect the opposite end faces of the gasketing or sealing collar 19 to prevent this collar from being squeezed or expunged out of groove 18 as the housing halves are clamped together.

It will be understood that sealing collar 19 and the end rings 22 suffice to seal the opposite ends of the splice casing to the respective cable ends without need for adapters, hardware or fittings of any kind. The thickness of the convolutions of sealing tape vary with the size of the cable which may vary in diameter from a very small size to a size substantially filling the inlet opening of the splice casing. The only component of this sealing expedient possibly in need of tailoring to size is end ring 22 the central opening of which may be readily trimmed to a large size. These rings are preferably formed of a material easily trimmed to size in the field as necessary to fit over the exterior of the cable sheath. Moreover, this opening need not be cut accurately to size so long as it is installable over the cable since the Buna tape easily seals any gap adjacent the periphery of the cable.

The kit of bonding accessories forming an important feature of this invention is illustrated in FIGS. 2 and 3 and comprises a heavy gauge ductile metal strap 25 preferably formed with openings 26 at spaced intervals therealong. This bonding strap is sufficiently strong to safely carry the tensile loads normally existing in the cables and long enough to overlap the unsevered portions of the cable sheath inwardly of the splice casing seals just described. Detachably securable to each end of strap 25 are similar bonding assemblies, designated generally 30, a suitable construction corresponding to that disclosed in our copending application Ser. No. 12,820, filed Feb. 19, 1970, and now abandoned.

Each bonding assembly 30 includes a wide area inner shoe 32, a generally similarly shaped and size outer shoe 33 interconnected to one another by clamping bolt 34 assembled through aligned openings formed in the cable shield jacket 35 and the tough plastic cable sheath 36. Clamping nut 37 is assembled over bolt 34 exteriorly of the outer shoe 33 and serves to clamp large areas of the cable shields 35 and sheath 36 tightly between shoes 32 and 33. Preferably but not necessarily the cable is served with tight wrappings 39 of friction tape before the outer shoe is assembled over bolt 34 but this tape serving may be dispensed with if the inner end of bolt 34 is threaded and screwed into a threaded opening in the inner shoe 32 after the latter has been inserted endwise between the cable conductors and the inner surface of shield jacket 35.

After the bonding assembly 30 has been securely anchored in place one end of strap 25 is placed over the outer end of the bolt and clamped in place by a lock nut 40. The other end of strap 25 is similarly assembled to a second bonding assembly 30, care being exercised to select the appropriate ones of holes 26 in strap 25 for assembly over the respective bolts 34. Thus the length of the strap should be so selected as to anchor the two cable ends together adjacent a respective one of the splice casing seal collars. The cable ends having been tied together by the described kit of bonding components, the workman proceeds to complete splice connections in the usual manner and generally indicated by the dotted line envelope 43 with assurance that these conductors will not be put under tensile strain because such strains are being transferred between the cable ends by strap 25 and assemblies 30.

The splice connections having been completed the operator then places splice casing half 11 against one side of the two sealing collars 19 and clamps the bonding strap 25 to the flattened lug 45 (FIG. 3) integral with the other end of a threaded closure plug 46. This closure plug is first assembled into a threaded opening 47 in casing half 11. Alternatively it will be understood that the clamping screw 48 for strap 25 may be screwed into a well formed in the splice casing wall and opening into the interior of the casing.

Each of the casing halves includes an integral radial suspension lug 50 formed with a transverse groove 51 to seat a grounded messenger cable 52. The splice casing is clamped to this cable in any suitable manner, as by clamp 53 and clamping screw 54.

From the foregoing it will be recognized that the metal splice casing halves 11,12 completely surround and enclose the splice connections 43 and provide an electrical shield embracing the entire splice and overlapping the shield jackets of each of the cable ends 20,20. Thus the assembled splice casing is an integral part of the cable shield and is electrically connected thereto by the bonding bar 25 and is likewise connected to ground potential through the grounded messenger cable and suspension lugs 50.

Referring to FIGS. 4–8, inclusive, there is shown a second embodiment of the invention kit of bonding components assembled to separate cables entering the opposite ends of the same type of splice casing 11',12' described above. The same or similar components of the second embodiment are designated by the same reference characters as employed in describing FIGS. 1–3 but are distinguished by the addition of a prime. The principal difference between the two embodiments resides in the use of a high-strength high-capacity strap 25' formed of a multiplicity of braided wires, the manner in which this strapping is connected between the cable ends at the opposite ends of the splice casing and grounded to the metallic splice casing, numerous construction details of the solderless bonding assembly 30' interconnecting straps 25', cable shield 35' and sheath 36', the means of connecting this strap to the bonding assemblies and to the splice housing, and the mode of installing these assemblies in the cable ends and beneath the sealing collars.

Referring first to the bonding assembly 30' best shown in FIGS. 6–8 and one of which assemblies will be understood as anchored to the cable end entering each end of the splice casing 10' as shown and described in connection with FIGS. 4 and 6, it being pointed out that assembly 30' is designed for installation astride the end of the cable shield 35' and sheath 36' without need for slitting, notching or punching an opening therethrough to accommodate the clamping shank 34' fixed to the trailing end of shoe 32'. In this connection it will be understood that the shoes of assembly 30' typically have a short trailing outer end and a relatively long leading end assembly astride the end of the cable sheath and between which wide area portions of the cable shield and sheath are compressed by the powerful leverage action produced by tightening the clamping bolt.

The installation of the inner shoe 32' is readily accomplished by first expanding the cable sheath and shield away from the underlying conductors by the aid of a pair of prongs or pins 75,75, preferably of nonmetallic material, having pointed leading ends 76,76. Cable conductors are customarily wrapped in a thin plastic sheath positioned immediately beneath the cable shield. The diameter of the prongs 75 is such that the cable sheath can be expanded sufficiently to greatly expedite the insertion of inner shoe 32' without risk of damaging the shield by the low height sharp ended burrs 61.

As here shown, burrs 61 are formed at the outer corner of tangs struck upwardly from the main body of inner shoe 32' after a V-shaped notch has been blanked from the end of the tang to be turned outwardly. There are preferably a multiplicity of the pointed burrs 61 here shown arranged in rows along either lateral edge of the inner shoe. The sharp burrs 61 are sufficiently high to penetrate into the shield layer 35' and they may even penetrate into the cable sheath 36'.

Another pair of projections or tangs 60,60 is struck outwardly and upwardly closely adjacent the base end of shank 34'. These tangs about the end of the cable sheath as best shown in FIG. 6 to limit the insertion of the bonding assembly lengthwise of the cable end and to assure that the longitudinal axis of the inner shoe lies parallel to the length of the cable.

It will also be understood that the outer shoe 33' is provided with a multiplicity of low height tangs 63,63 which project toward the adjacent surface of the inner shoe and which are forced to penetrate into the main body of the cable sheath 36' as the two shoes are clamped against the remote surfaces of the cable sheath and shield.

The trailing or outer end of each shoe is also provided with low but side projections or tangs 65,66. These tangs project toward one another and one of them acts as a fulcrum about which the shoes pivot during tightening of the clamping means. Desirably and as herein shown by way of example, the end 67 of tang 66 contacts and fulcrums against the inner shoe 32' and against the base of tang 65. The arrangement provides the installer with a clear view of these important parts and of the fulcrum area but it will be recognized that the shoes can be so designed that the outer end of tang 65 fulcrums against the underside of shoe 33' and the base of its tang 66. Preferably, the end edge of the tang used as a fulcrum is arched transversely of the shoe to mate with the similarly arched surface of the shoe surface against which it pivots. This not only provides a strong fulcrum bearing surface but, more importantly, a large area conductive path supplementing the conductive path between the two shoes provided by the clamping bolt 34' and nut 37'. These two parallel paths form a highly desirable low resistance path for high amperage currents sometimes accidentally flowing in cable shields. As is readily apparent, the current carrying capacity of bolt 34' by itself is substantially less than that of the two shoes as well as clip 70 and strap 25'. This deficiency is more than compensated for by the above described supplemental current path afforded by the engaging and fulcruming tangs 65,66.

The assembly operation of bonding assembly 30' will be evident from the foregoing description. Inner shoe 32' is assembled first with the aid of prongs 75,75 in the manner described above in connection with FIG. 9. The leading end of the inner shoe having been inserted until the aligning tang projections 60,60 abut the end of the cable sheath, the operator assembles the outer shoe 33' over the clamping shank 34'. It will be understood that each of these shoes is similarly arched transversely of the shoe in order that their adjacent inner surfaces will lie parallel to one another in the fully assembled and installed position of the bonding assembly. After the inner shoe is in place, prongs 75 are removed and clamping nut 37' is placed over the shank and tightened. During the tightening operation the longer ends of the two shoes pivot toward one another about the axis of fulcrum 67 causing the sharp burrs 61 to penetrate into the shield 35' and tangs 63 to penetrate into the cable sheath 36'. When clamping nut 37' is fully tightened the two shoes lie parallel to one another with large areas of the shield and sheath compressed and in high pressure contact with a respective one of the shoes.

After a bonding assembly 30' has been similarly assembled to the cable entering each end of splice housing 10, a gasketing and sealing collar 19' is assembled about each cable with a major portion of the trailing end of each bonding assembly concealed within the sealing collar 19' in the manner clearly shown in FIG. 4. Only the trailing end supporting the clamping shank 34' is located inside the inner end of the sealing collar. The cable splicing technician may then proceed to complete splicing operations following which the combined tension transfer and bonding strap 25 is installed between the two bonding assemblies 30'.

In consequence of the foregoing, it will be recognized that bonding assembly 30' occupies a minimum of space inwardly of the cable seal assembly 19',22' thereby leaving substantially the entire interior of the splice casing available for occupation by the spliced cable conductors. Accordingly, the cable conductors can be fanned out closely adjacent the inner ring 22' and substantially closer thereto than is possible with previous modes of installing bonding connections to the cable shields.

The braided strap 25' electrically and mechanically interconnecting the bonding assemblies 30' at the opposite ends of the splice housing utilizes a simple but highly effective solderless terminal clip 70. This clip, disclosed in greater detail in application Ser. No. 107,794, filed Jan. 19, 1971 by John T. Thompson and George W. Gillemot, now U.S. Pat. No. 3,732,354, is stamped from high strength tempered spring stock and its two legs 71,72 diverge from one another prior to being clamped together. The bight portion of clip 70 is provided with a rectangular opening sized to accommodate insertion of strap 25' even when one end is folded back upon itself to provide a branch 25" electrically connecting the bonding assemblies 30' to the splice casing. For this purpose, the end of strap 25" is compactly rolled, inserted into a well at the end of plug 46' and held clamped therein by a set screw 48'.

The clip legs 71,72 are provided with a plurality of sharp edged projections 73 extending inwardly from the inner faces of the two legs. As the clip legs are forcibly closed toward one another by a clamping nut 40' the hardened edges of projection 73 penetrate into the braid of strap 25' to assure excellent electrical contact as well as a more positive mechanical anchorage with the strap. The resulting high strength electrical and mechanical connection thereby provided between straps 25',25", clip legs 71,72 and bonding assembly 30' as the legs are compressed toward one another over shank 34' by lock nut 40', assures a powerful tensile load transfer connection between the sheaths of the two cables 20',20' entering the opposite ends of the splice casing as well as electrical bonding connection between the cable shields and the splice casing. It is found that the wide area surface contact between the long and broad legs of clip 70 together with the internesting of the projections 73 between the wires of straps 25' develops the full strength of the straps and transfers the load stresses customarily present in cabling while isolating and protecting the splice connections themselves against these tensile stresses.

While the particular cable bonding assembly and method for use with spliced cables herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

We claim:

1. In combination with a shielded cable having an outer protective sheath and an underlying shield enclosing conductors which extend beyond the ends of the protective sheath and the shield:
   a. an inner shoe having a leading end inserted between the shield and the conductors and having a trailing end;
   b. said inner shoe having laterally spaced tangs engaging the ends of the sheath and the shield to limit insertion of said inner shoe;
   c. said inner shoe having a radially outwardly extending stud between its trailing end and said tangs;
   d. an outer shoe having a hole receiving said stud and having a leading end overlying the protective sheath;
   e. interengageable fulcrum means at the trailing ends of said inner and outer shoes; and
   f. a nut threaded on said stud and clamping said outer shoe against the protective sheath about said fulcrum means.

2. The combination set forth in claim 1 wherein said fulcrum means includes an outwardly extending tang at the trailing end of said inner shoe and an inwardly extending tang at the trailing end of said outer shoe and engaging said outwardly extending tang, said inwardly extending tang being located between said outwardly extending tang and said leading end of said inner shoe.

3. The combination set forth in claim 2 including a tension strap secured to said stud.

4. In combination with a shielded cable having an outer protective sheath and an underlying shield enclosing conductors which extend beyond the ends of the protective sheath and the shield:
   a. an inner shoe having a leading end inserted between the shield and the conductors and having a trailing end;
   b. said inner shoe having a radially outwardly extending stud adjacent its trailing end;
   c. an outer shoe having a hole receiving said stud and having a leading end overlying the protective sheath;
   d. interengageable fulcrum means at the trailing ends of said inner and outer shoes;
   e. a nut threaded on said stud and clamping said outer shoe against the protective sheath about said fulcrum means; and
   f. said fulcrum means including an outwardly extending tang at the trailing end of said inner shoe and an inwardly extending tang at the trailing end of said outer shoe and engaging said outwardly extending tang, said inwardly extending tang being located between said outwardly extending tang and said leading end of said inner shoe.

5. A kit for attachment to an outer protective sheath and an underlying shield of a shielded cable having conductors extending beyond the ends of the protective sheath and the shield, including:
   a. an inner shoe having a leading end insertable between the shield and the conductors and having a trailing end;
   b. a stud on said inner shoe adjacent the trailing end thereof and extending radially outwardly when the leading end of said inner shoe is inserted between the shield and the conductors;
   c. an outer shoe having a leading end adapted to overlie the protective sheath and having a trailing end;
   d. said outer shoe having a hole adjacent its trailing end adapted to receive said stud when said inner shoe is inserted between the shield and the conductors and when said outer shoe overlies the protective sheath;
   e. interengageable fulcrum elements adjacent the trailing ends of the inner and outer shoes and interengageable when said inner shoe is inserted between the shield and the conductors and said outer shoe overlies the protective sheath;
   f. a nut adapted to be threaded on said stud to pivot said outer shoe about said fulcrum elements, when interengaged, to pivot said outer shoe into clamping engagement with the protective sheath, thereby clamping the protective sheath and the shield between said inner and outer shoes; and
   g. said fulcrum elements respectively including an outwardly extending tang at the trailing end of said inner shoe and an inwardly extending tang at the trailing end of said outer shoe, said inwardly extending tang being located between said outwardly extending tang and the leading end of said inner shoe, and said inwardly extending tang being seated against said outwardly extending tang, all when said stud is disposed in said hole in said outer shoe and said nut is tightened on said stud.

6. A kit as defined in claim 5 wherein said inner and outer shoes and said outwardly and inwardly extending tangs thereon are curved transversely of said inner and outer shoes.

7. A kit for attachment to an outer protective sheath and an underlying shield of a shielded cable having exposed conductors extending beyond the ends of the protective sheath and the shield, including:
   a. an inner shoe having a leading end insertable between the shield and the conductors and having a trailing end;
   b. a stud on said inner shoe adjacent the trailing end thereof and extending radially outwardly when the leading end of said inner shoe is inserted between the shield and the conductors;
   c. an outer shoe having a leading end adapted to overlie the protective sheath and having a trailing end;
   d. said outer shoe having a hole adjacent its trailing end adapted to receive said stud when said inner shoe is inserted between the shield and the conductors and when said outer shoe overlies the protective sheath;
   e. interengageable fulcrum elements adjacent the trailing ends of the inner and outer shoes and interengageable when said inner shoe is inserted between the shield and the conductors and said outer shoe overlies the protective sheath;
   f. a nut adapted to be threaded on said stud to pivot said outer shoe about said fulcrum elements, when interengaged, to pivot said outer shoe into clamping engagement with the protective sheath, thereby clamping the sheath and the shield between said inner and outer shoes; and
   g. laterally spaced tangs on said inner shoe intermediate said stud and said leading end of said inner shoe and engageable with the ends of the protective sheath and the shield to limit insertion of said inner shoe between the shield and the conductors and to align the inner shoe longitudinally of the cable.

8. A kit as defined in claim 7 wherein said interengageable fulcrum elements respectively include an outwardly extending tang at the trailing end of said inner shoe and an inwardly extending tang at the trailing end of said outer shoe, said inwardly extending tang being located between said outwardly extending tang and the leading end of said inner shoe, and said inwardly extending tang being seated against said outwardly extending tang, all when said stud is disposed in said hole in said outer shoe and said nut is tightened on said stud.

9. A kit as defined in claim 7 including a tension strap having at one end a hole adapted to receive said stud and to be attached thereto by a nut threadable onto said stud.

10. A kit as defined in claim 9 including a tempered U-shaped metal clip at said end of said tension strap, said clip having an opening in the bight portion thereof for the insertion of strapping for the major length of the clip legs, the free ends of said legs being clampable toward one another by a nut threadable onto said stud.

11. A kit as defined in claim 7 characterized in the provision of a pair of elongated expander prongs each having one pointed end and insertable lengthwise of and under the cable shield to make room for the insertion thereunder of the leading end of said inner shoe.

12. A kit as defined in claim 7 characterized in that said inner shoe includes a multiplicity of sharp burrs protruding from the surface thereof toward said outer shoe upon assembly.

13. A kit as defined in claim 12 characterized in that said burrs are arranged in pairs at the outer corners of individual tangs struck outwardly from the surface of said inner shoe.

* * * * *

UNITED STATES PATENT OFFICE
CERTIFICATE OF CORRECTION

Patent No. 3,915,540              Dated October 28, 1975

Inventor(s) John T. Thompson et al.

It is certified that error appears in the above-identified patent and that said Letters Patent are hereby corrected as shown below:

Column 1, line 20, "the" should be --this--;

Column 3, line 36, "betwen" should be --between--;

Column 4, line 15, after "casing" insert --having--;

Column 4, line 30, "Fig. 9..." should be a new paragraph;

Column 4, line 38, "clamping cap screws 13" should be --clamping screws 13--;

Column 7, line 14, "side" should be --wide--; and

Column 7, line 20, "The" should be --This--.

Signed and Sealed this eighth Day of June 1976

[SEAL]

Attest:

RUTH C. MASON
Attesting Officer

C. MARSHALL DANN
Commissioner of Patents and Trademarks